United States Patent
Oreins et al.

(10) Patent No.: US 6,740,412 B2
(45) Date of Patent: May 25, 2004

(54) POLYMERIC ADHESIVE AND STRUCTURES WITH MULTIPLE POLYMERIC LAYERS, THEIR PROCESS OF PREPARATION AND THEIR USE

(75) Inventors: Jean-Marie Oreins, Haacht (BE); Vincent Thulliez, Brussels (BE); Guy Laurent, Vedrin (BE); Fredy Declerck, Grimbergen (BE)

(73) Assignee: Solvay (Societe Anonyme), Brussels (BE)

(*) Notice: Subject to any disclaimer, the term of this patent is extended or adjusted under 35 U.S.C. 154(b) by 0 days.

(21) Appl. No.: 09/900,192

(22) Filed: Jul. 9, 2001

(65) Prior Publication Data
US 2002/0012801 A1 Jan. 31, 2002

Related U.S. Application Data

(62) Division of application No. 09/358,842, filed on Jul. 22, 1999, now Pat. No. 6,277,914.

(30) Foreign Application Priority Data

Jul. 27, 1998 (BE) ............................................... 9800563

(51) Int. Cl.[7] ........................ B32B 27/00; B32B 31/30; C08L 51/00
(52) U.S. Cl. .................... 428/421; 428/422; 428/476.3; 428/516; 525/72; 525/199; 524/504; 158/334; 264/173.12; 264/173.14
(58) Field of Search .......................... 525/70, 72, 199, 525/191, 222, 207; 529/504, 104; 428/421, 422, 476.3, 476.9, 516, 518, 520; 156/308.2, 327, 331.9, 332, 333, 334; 264/173.14, 173.12

(56) References Cited

U.S. PATENT DOCUMENTS

| | | | | |
|---|---|---|---|---|
| 2,710,821 A | * | 6/1955 | Fischer ........................ | 156/320 |
| RE24,856 E | * | 8/1960 | Panagrossi et al. .......... | 156/283 |
| 2,994,632 A | * | 8/1961 | Brown ........................ | 156/332 |
| 3,526,532 A | * | 9/1970 | Heiberger .................... | 428/421 |
| 4,444,826 A | * | 4/1984 | Sasaki et al. ................ | 428/216 |
| 4,585,694 A | | 4/1986 | Dehennau | |
| 5,108,844 A | * | 4/1992 | Blemberg et al. ........ | 264/173.13 |
| 5,139,878 A | * | 8/1992 | Kim et al. .................... | 428/421 |
| 5,242,976 A | * | 9/1993 | Strassel et al. ................ | 525/72 |
| 5,284,710 A | * | 2/1994 | Hartley et al. ............... | 428/421 |
| 5,565,121 A | * | 10/1996 | Forslund ..................... | 219/217 |
| 5,589,544 A | | 12/1996 | Horrion | |
| 5,795,654 A | * | 8/1998 | Koishi et al. ................ | 428/421 |
| 5,945,221 A | * | 8/1999 | Tsai et al. .............. | 264/173.13 |
| 6,277,914 B1 | * | 8/2001 | Oreins et al. ................. | 525/70 |

FOREIGN PATENT DOCUMENTS

| | | |
|---|---|---|
| EP | 0 112 406 | 7/1984 |
| EP | 0 124 931 | 11/1984 |
| EP | 0 206 689 | 12/1986 |
| EP | 0 450 994 | 10/1991 |
| EP | 0 484 053 | 5/1992 |

OTHER PUBLICATIONS

Abstr of JP Pat. Appln. JP 62/057448 (Mitsubishi Petrochemical Co., Ltd. JP); "Fluoropolymer Blends". May 9, 1985.

* cited by examiner

*Primary Examiner*—Paul Thibodeau
*Assistant Examiner*—Kevin R Kruer
(74) *Attorney, Agent, or Firm*—Stites & Harbison PLLC; B. Aaron Schulman

(57) ABSTRACT

Polymeric adhesive comprising a homogeneous mixture of at least three constituents: (a) at least one thermoplastic halogenated hydrocarbon polymer, (b) at least one copolymer of monoethylenic monomers which carry an alkyl carboxylate functional group and (c) at least one alpha-olefin polymer modified by the incorporation of at least one functional group chosen from a carboxyl, an acid anhydride, a hydroxyl and an epoxide. Process for the preparation of this polymeric adhesive and use of this polymeric adhesive in the preparation of structures with multiple polymeric layers.

Structures with multiple polymeric layers comprising a layer (A) based on thermoplastic halogenated hydrocarbon polymer bonded to a layer (C) based on thermoplastic nonhalogenated polymer incompatible with (A) via a layer (B) based on this polymeric adhesive. Process for the preparation of these structures with multiple polymeric layers and use of these structures with multiple polymeric layers in the preparation of pipes, tubes, films, sheets, panels or hollow bodies which can be used in particular in the automobile field.

9 Claims, No Drawings

POLYMERIC ADHESIVE AND STRUCTURES WITH MULTIPLE POLYMERIC LAYERS, THEIR PROCESS OF PREPARATION AND THEIR USE

This application is a division of prior application Ser. No. 09/358,842 filed Jul. 22, 1999, now U.S. Pat. No. 6,277,914.

The present invention relates to a polymeric adhesive and to structures with multiple polymeric layers comprising a layer (A) made of thermoplastic halogenated hydrocarbon polymer bonded to a layer (C) made of thermoplastic non-halogenated polymer incompatible with (A) via a layer (B) based on a polymeric adhesive. The invention also relates to processes for the preparation of this adhesive and of these structures. The invention additionally relates to the use of this adhesive in the preparation of these structures and to the use of these structures in the manufacture of pipes, tubes, films, sheets, panels and hollow bodies.

Thermoplastic halogenated hydrocarbon polymers and more particularly thermoplastic fluorinated hydrocarbon polymers are polymers which exhibit an array of advantageous properties and in particular impermeability to liquids and gases, high chemical inertia and excellent behaviour towards ageing. For this reason, they have multiple applications in highly diverse fields and in particular in the transportation and storage of liquids and gases and in protection against corrosion. Nevertheless, they exhibit the disadvantage of being relatively expensive, with the risk of their outlets being restricted.

An appropriate means for reducing the cost of shaped articles made of this type of polymer consists in using these polymers in the form of structures with multiple polymeric layers (films, sheets, panels, pipes, hollow bodies, and the like) in which they are used in combination with other polymers, which furthermore contribute their own properties and advantages, such as, for example, mechanical strength, aptitude for sealing, resistance to scratching, and the like. However, thermoplastic halogenated hydrocarbon polymers and more particularly thermoplastic fluorinated hydrocarbon polymers are known to be materials which cannot easily be made to adhere to other polymers.

To solve this problem, numerous solutions have been provided and in particular to insert a layer of adhesive between the halogenated polymer and the incompatible polymer, in order to provide an adhesive bond between these two polymers.

This type of solution has been disclosed in particular in Patent Applications EP-A1-112,406, EP-A1-124,931 and EP-A1-484,053.

Thus, Patent Application EP-A1-112,406 relates to a multilayer hollow container composed of an internal layer made of thermoplastic fluorocarbon-comprising resin bonded to an external layer made of polyolefin via a layer made of a mixture of resins comprising a polyolefin grafted with an unsaturated glycidyl compound and a polyolefin.

Likewise, Patent Application EP-A1-124,931 discloses multiple-layer thermoplastic structures comprising a layer made of vinyl or vinylidene fluoride polymer bonded to a layer made of alpha-olefin polymer with the joint involvement of a vinyl acetate polymer and of a copolymer of ethylene and of vinyl acetate.

Patent Application EP-A1-484,053 mentions a process for the preparation of a 3-layer laminate composed of a layer of an olefinic polymer to which a layer of fluorinated resin is made to adhere by melting with the aid of an adhesive polymer which consists of a polymerization product of an olefinic polymer with a monomer comprising an alkyl (meth)acrylate and/or an unsaturated monomer comprising fluorine.

These types of adhesive layers provided as solutions in these specific cases do not, however, comprise a mixture of the two polymers which are to be made to adhere and for this reason exhibit adhesive properties which might be improved.

Provision has also been made to make a halogenated polymer, in this instance a fluorinated polymer, adhere to an incompatible polymer via two distinct layers of adhesive.

Thus, Patent EP-B1-206,689 relates to a laminate comprising at least two distinct layers of adhesive in contact, composed of a fluorinated hydrocarbon polymer modified by a carboxyl, acid anhydride, hydroxyl or epoxide group and of an alpha-olefin polymer modified by a carboxyl, acid anhydride, hydroxyl or epoxide group different from the preceding group. These two distinct layers of adhesive can be placed on a substrate layer prepared from a material chosen from various polymers, including poly(vinylidene fluoride), polyethylene and nylon. Thus, a 4-layer laminate is mentioned comprising a PVDF layer bonded to a PE layer via two distinct layers of adhesive. This multilayer structure exhibits the disadvantage of being composed of two layers of adhesive and thus a total of 4 layers, which presents technical problems during the industrial coextrusion, which can be more easily envisaged technically if it is limited to 3 layers, thus with a single layer of adhesive.

Due to their lower cost and to the technical considerations with regard to manufacture described above, structures having a single layer of adhesive are preferred to those comprising more than one layer of adhesive.

The problem which remains is therefore that of providing an adhesive which can satisfactorily bond to a layer of thermoplastic halogenated hydrocarbon polymer, on one side, and to a layer of incompatible thermoplastic polymer, on the other side, for the purpose of forming structures with multiple polymeric layers comprising only a single layer of adhesive.

In order to overcome the abovementioned disadvantage, the object of the present invention is to provide a homogeneous polymeric adhesive which comprises a mixture of the two polymers to be made to adhere and which thus makes it possible to provide good adhesion between a thermoplastic halogenated hydrocarbon polymer and an incompatible thermoplastic polymer.

Another subject-matter of the invention is, a process for the preparation of this adhesive and the use of this adhesive in the preparation of structures with multiple polymeric layers.

Another object of the invention is to provide structures with multiple polymeric layers comprising a layer (A) made of thermoplastic halogenated hydrocarbon polymer bonded to a layer (C) made of incompatible thermoplastic nonhalogenated polymer via a single layer (B) based on a homogeneous polymeric adhesive which makes it possible for these structures to combine good adhesion with good barrier properties and with a not excessively high cost, to be easily coextruded industrially and not to exhibit, for this reason, the abovementioned disadvantage.

Another subject-matter of the invention is a process for the preparation of these structures with multiple polymeric layers and the use of these structures with multiple polymeric layers in the manufacture of pipes, tubes, films, sheets, panels and hollow bodies.

The invention first of all relates to a polymeric adhesive which is particularly suitable for providing good adhesion between a thermoplastic halogenated hydrocarbon polymer and an incompatible thermoplastic polymer.

To this end, the invention relates to a polymeric adhesive which comprises a homogeneous mixture of at least three components: (a) at least one thermoplastic halogenated hydrocarbon polymer, (b) at least one copolymer of monoethylenic monomers which carry an alkyl carboxylate functional group and (c) at least one alpha-olefin polymer modified by the incorporation of at least one functional group chosen from a carboxyl, an acid anhydride, a hydroxyl and an epoxide.

The term "thermoplastic halogenated hydrocarbon polymer" is understood to denote homopolymers and copolymers obtained from monoethylenic monomers comprising at least two carbon atoms and at least one halogen atom chosen from fluorine and chlorine. It is also understood to denote mixtures of homopolymers and of copolymers. Mention may in particular be made, as examples of thermoplastic halogenated hydrocarbon polymer which can be used in the present invention, of homopolymers and copolymers of vinylidene fluoride, of vinyl fluoride, of trifluoroethylene, of chlorotrifluoroethylene, of tetrafluoroethylene, of hexafluoropropylene, of vinyl chloride and of vinylidene chloride, as well as copolymers of one of these monomers with another nonhalogenated monoethylenic monomer, such as ethylene, vinyl acetate and acrylic or methacrylic monomers.

The thermoplastic halogenated hydrocarbon polymer (a) is preferably a thermoplastic fluorinated hydrocarbon polymer. In a most preferred way, the thermoplastic halogenated hydrocarbon polymer (a) is a vinylidene fluoride polymer.

The term "thermoplastic fluorinated hydrocarbon polymer" is understood to denote homopolymers and copolymers obtained from monoethylenic monomers comprising at least two carbon atoms and at least one fluorine atom. The monoethylenic monomers can additionally comprise one or more chlorine atoms in addition to the fluorine atoms. The term is also understood to denote mixtures of homopolymers and of copolymers. Mention may in particular be made, as examples of thermoplastic fluorinated hydrocarbon polymer which can be used in the present invention, of homopolymers and copolymers of vinylidene fluoride, of vinyl fluoride, of trifluoroethylene, of chlorotrifluoroethylene, of tetrafluoroethylene and hexafluoropropylene, as well as copolymers of one of these monomers with another nonhalogenated monoethylenic monomer, such as ethylene, vinyl acetate and acrylic or methacrylic monomers. Vinylidene fluoride polymers are preferred.

The term "vinylidene fluoride polymer" is understood to denote, for the purposes of the present invention, any polymer comprising at least approximately 75% by weight of monomer units derived from vinylidene fluoride. Vinylidene fluoride polymers which may be suitable for producing structures with multiple polymeric layers according to the invention therefore comprise both vinylidene fluoride homopolymers and copolymers of vinylidene fluoride comprising monomer units derived from one or more ethylenically unsaturated comonomers which are advantageously fluorinated, as well as mixtures of these polymers. Mention may be made, by way of example of fluorinated comonomers which can be used, of vinyl fluoride, trifluoroethylene, chlorotrifluoroethylene, tetrafluoroethylene and hexafluoropropylene.

The copolymer of monoethylenic monomers which carry an alkyl carboxylate functional group (b) which can be used for the purposes of the present invention is a copolymer of at least two monoethylenic monomers which carry an alkyl carboxylate functional group.

Preference is given, among monoethylenic monomers carrying an alkyl carboxylate functional group which can be used for the implementation of the present invention, to alkyl carboxylates which can be obtained by the reaction of a monoethylenic carboxylic acid comprising a total of at least 3 carbon atoms, preferably at least 5 carbon atoms, alternatively at least 8 carbon atoms, with an alcohol chosen from linear or branched alcohols comprising at least 1 carbon atom and at most 20 carbon atoms, such as, for example, methanol, ethanol, isopropanol, n-butanol, isobutanol, t-butanol, hexanol, n-octanol, 2-ethylhexanol, decanol, isodecanol, lauryl alcohol, hexadecanol and octadecanol, but also glycidol, cyclohexanol and benzyl alcohol. Among these alcohols, those comprising from 1 to 10 carbon atoms are preferred. Methanol and glycidol are very particularly preferred. Methyl and glycidyl acrylates and methacrylates are the preferred monoethylenic monomers carrying an alkyl carboxylate functional group. Methyl and glycidyl methacrylates are very particularly preferred.

Preference is given, among monoethylenic monomers carrying an alkyl carboxylate functional group which can be used for the implementation of the present invention, to alkyl carboxylates which can be obtained by the reaction of a monoethylenic carboxylic acid comprising a total of at most 8 carbon atoms, preferably at most 5 carbon atoms, alternatively at most 3 carbon atoms, with an alcohol chosen from linear or branched alcohols comprising at least 1 carbon atom and at most 20 carbon atoms, such as, for example, methanol, ethanol, isopropanol, n-butanol, isobutanol, t-butanol, hexanol, n-octanol, 2-ethylhexanol, decanol, isodecanol, lauryl alcohol, hexadecanol and octadecanol, but also glycidol, cyclohexanol and benzyl alcohol. Among these alcohols, those comprising from 1 to 10 carbon atoms are preferred. Methanol and glycidol are very particularly preferred. Methyl and glycidyl acrylates and methacrylates are the preferred monoethylenic monomers carrying an alkyl carboxylate functional group. Methyl and glycidyl methacrylates are very particularly preferred.

The copolymer (b) is preferably a copolymer of two monoethylenic monomers which carry an alkyl carboxylate functional group, it being possible for each of them to be obtained by the reaction of a monoethylenic monomer carrying a carboxylic acid functional group comprising a total of 3 to 8 carbon atoms with a linear or branched alcohol comprising from 1 to 20 carbon atoms.

In a most preferred way, the copolymer (b) is a copolymer of two monoethylenic monomers which carry an alkyl carboxylate functional group, it being possible for each of them to be obtained by the reaction of a monoethylenic monomer carrying a carboxylic acid functional group comprising a total of 3 to 5 carbon atoms with a linear or branched alcohol comprising from 1 to 10 carbon atoms.

The very particularly preferred copolymer (b) is a copolymer of methyl methacrylate and of glycidyl methacrylate.

The copolymer (b) used for the purposes of the present invention can comprise at least from 5 to 95% by weight, with respect to the total weight of the monomers, of the first monoethylenic monomer carrying a carboxylate functional group and at least from 95 to 5% by weight, with respect to the total weight of the monomers, of the second monoethylenic monomer carrying a carboxylate functional group.

The copolymer (b) preferably comprises approximately 50% by weight, with respect to the total weight of the monomers, of each of the monoethylenic monomers carrying an alkyl carboxylate functional group.

The copolymer (b) used for the purposes of the present invention can also comprise amounts of less than or equal to 5% by weight, with respect to the total weight of the monomers, of other monomers which are copolymerizable with the monoethylenic monomers carrying a carboxylate functional group. Mention may be made, by way of examples, of acrylic acid and methacrylic acid.

The modified alpha-olefin polymer (c) which can be used for the purposes of the present invention is a polymer which can be prepared from a homopolymer or from a copolymer of an alpha-olefin. Preferred examples of alpha-olefin polymers comprise polyethylene, polypropylene, an ethylene/propylene copolymer, an ethylene/1-butene copolymer, an ethylene/4-methyl-1-pentene copolymer, a propylene/1-butene copolymer, poly(1-butene) and copolymers of the abovementioned alpha-olefins with minor amounts of diolefins or of unsaturated carboxylic acid esters, such as an ethylene/butadiene copolymer, a propylene/butadiene copolymer, an ethylene/vinyl acetate copolymer and an ethylene/ethyl acrylate copolymer.

In order to prepare a modified alpha-olefin polymer, at least one functional group chosen from a carboxyl, an acid anhydride, hydroxyl and an epoxide can be incorporated in one of the alpha-olefin polymers defined above or in a composition of these polymers. The functional group can be introduced into the alpha-olefin polymer by a series of methods, such as a method in which a polymerizable monomer carrying the functional group is incorporated in the alpha-olefin polymer by statistical or block copolymerization or by grafting, a method in which the reactive group of the alpha-olefin polymer reacts with a compound carrying the functional group or a group which can form the functional group by reaction, and a method in which the alpha-olefin polymer is modified by oxidation, hydrolysis or any other appropriate method. The first and the third methods are preferred because they make it possible to easily introduce, and in a controlled amount, the functional group into the alpha-olefin polymer. Copolymerization by grafting is particularly preferred for two reasons: a low amount of functional group is sufficient to improve the adhesion and the modified polymer does not undergo an excessively great deterioration in its physical properties.

Examples of monomers carrying a carboxyl or acid anhydride group are acrylic acid, methacrylic acid, maleic acid, fumaric acid, itaconic acid, crotonic acid, citraconic acid, maleic anhydride, itaconic anhydride, crotonic anhydride and citraconic anhydride. Acrylic acid and maleic anhydride are preferred with the aim of improving the adhesion. Maleic anhydride is very particularly preferred.

A hydroxyl group can be introduced by hydrolysis of a copolymer of a vinyl ester, such as vinyl acetate or vinyl propionate, or by copolymerization of an unsaturated alcohol, such as a dihydric alcohol, with an acrylic or methacrylic acid ester.

Examples of monomers carrying a hydroxyl group are 2-hydroxyethyl acrylate and methacrylate, 2-hydroxypropyl acrylate and methacrylate, 2-hydroxybutyl acrylate and methacrylate, N-(methylol)acrylamide and N(methylol)methacrylamide, 2-propyn-1-ol and hydroxy vinyl ethers.

Examples of monomers carrying an epoxide group are glycidyl acrylate, glycidyl methacrylate, glycidyl ethylacrylate, mono- and diglycidyl itaconate, mono- and diglycidyl maleate, mono- and diglycidyl allylsuccinate, allyl glycidyl ether, 2-methylallyl glycidyl ether, p-glycidylstyrene, 3,4-epoxy-1-butene, 3,4-epoxy-3-methyl-1-butene and vinylcyclohexene monoxide.

The modified alpha-olefin polymer (c) which is very particularly preferred is polyethylene grafted with maleic anhydride.

The modified alpha-olefin polymer can comprise at least 0.1% by weight of functional group. The modified alpha-olefin polymer can comprise at least 0.5%, at least 1%, at least 10%, at least 20% or at least 30% by weight of functional group.

The modified alpha-olefin polymer can alternatively comprise at most 30% by weight of functional group. The modified alpha-olefin polymer can comprise at most 20%, at most 10%, at most 1%, at most 0.5% or at most 0.1% by weight of functional group.

For the purpose of obtaining good peel strengths, it is preferable for the modified alpha-olefin polymer to comprise at least 0.1% by weight of functional group. The modified alpha-olefin polymer preferably comprises at least 0.5% by weight of functional group. In a very particularly preferred way, the modified alpha-olefin polymer comprises at least 1% by weight of functional group.

For the purpose of obtaining an improved aptitude for moulding and improved physical properties (such as, for example, a good balance between impact strength and stiffness), it is preferable for the modified alpha-olefin polymer to comprise at most 30% by weight of functional group. The modified alpha-olefin polymer preferably comprises at most 20% by weight of functional group. In a very particularly preferred way, the modified alpha-olefin polymer comprises at most 10% by weight of functional group.

The thermoplastic halogenated hydrocarbon polymer (a) is present in the homogeneous mixture constituting the polymeric adhesive of the present invention, for a total weight of 100%, in an amount of at least 20%, of at least 25%, of at least 30%, of at least 72%, of at least 77% or of at least 80%.

The thermoplastic halogenated hydrocarbon polymer (a) is alternatively present in the homogeneous mixture constituting the polymeric adhesive of the present invention, for a total weight of 100%, in an amount of at most 80%, of at most 77%, of at most 72%, of at most 30%, of at most 25% or of at most 20%.

The thermoplastic halogenated hydrocarbon polymer (a) is preferably present in the homogeneous mixture constituting the polymeric adhesive of the present invention, for a total weight of 100%, in an amount of at least 25%. In a very particularly preferred way, the thermoplastic halogenated hydrocarbon polymer (a) is present in the homogeneous mixture constituting the polymeric adhesive of the present invention, for a total weight of 100%, in an amount of at least 30%.

The thermoplastic halogenated hydrocarbon polymer (a) is preferably present in the homogeneous mixture constituting the polymeric adhesive of the present invention, for a total weight of 100%, in an amount of at most 77%. In a very particularly preferred way, the thermoplastic halogenated hydrocarbon polymer (a) is present in the homogeneous mixture constituting the polymeric adhesive of the present invention, for a total weight of 100%, in an amount of at most 72%.

The copolymer of monoethylenic monomers which carry an alkyl carboxylate functional group (b) is present in the homogeneous mixture constituting the polymeric adhesive of the present invention, for a total weight of 100%, in an amount of at least 36%, of at least 5%, of at least 7%, of at least 30%, of at least 35% or of at least 40%.

The copolymer of monoethylenic monomers which carry an alkyl carboxylate functional group (b) is alternatively present in the homogeneous mixture constituting the polymeric adhesive of the present invention, for a total weight of 100%, in an amount of at most 40%, of at most 35%, of at most 30%, of at most 7%, of at most 5% or of at most 3%.

The copolymer of monoethylenic monomers which carry an alkyl carboxylate functional group (b) is preferably present in the homogeneous mixture constituting the polymeric adhesive of the present invention, for a total weight of 100%, in an amount of at least 5%. In a very particularly preferred way, the copolymer of monoethylenic monomers which carry an alkyl carboxylate functional group (b) is present in the homogenous mixture constituting the polymeric adhesive of the present invention, for a total weight of 100%, in an amount of at least 7%.

The copolymer of monoethylenic monomers which carry an alkyl carboxylate functional group (b) is preferably present in the homogeneous mixture constituting the polymeric adhesive of the present invention, for a total weight of 100%, in an amount of at most 35%. In a very particularly preferred way, the copolymer of monoethylenic monomers which carry an alkyl carboxylate functional group (b) is present in the homogeneous mixture constituting the polymeric adhesive of the present invention, for a total weight of 100%, in an amount of at most 30%.

The alpha-olefin polymer modified by the incorporation of at least one functional group chosen from a carboxyl, an acid anhydride, a hydroxyl and an epoxide (c) is present in the homogeneous mixture constituting the polymeric adhesive of the present invention, for a total weight of 100%, in an amount of at least 15%, of at least 17%, of at least 20%, of at least 45%, of at least 50% or of at least 55%.

The alpha-olefin polymer modified by the incorporation of at least one functional group chosen from a carboxyl, an acid anhydride, a hydroxyl and an epoxide (c) is alternatively present in the homogeneous mixture constituting the polymeric adhesive of the present invention, for a total weight of 100%, in an amount of at most 55%, of at most 50%, of at most 45%, of at most 20%, of at most 17% or of at most 15%.

The alpha-olefin polymer modified by the incorporation of at least one functional group chosen from a carboxyl, an acid anhydride, a hydroxyl and an epoxide (c) is preferably present in the homogeneous mixture constituting the polymeric adhesive of the present invention, for a total weight of 100%, in an amount of at least 17%. In a very particularly preferred way, the alpha-olefin polymer modified by the incorporation of at least one functional group chosen from a carboxyl, an acid anhydride, a hydroxyl and an epoxide (c) is present in the homogeneous mixture constituting the polymeric adhesive of the present invention, for a total weight of 100%, in an amount of at least 20%.

The alpha-olefin polymer modified by the incorporation of at least one functional group chosen from a carboxyl, an acid anhydride, a hydroxyl and an epoxide (c) is preferably present in the homogeneous mixture constituting the polymeric adhesive of the present invention, for a total weight of 100%, in an amount of at most 50%. In a very particularly preferred way, the alpha-olefin polymer modified by the incorporation of at least one functional group chosen from a carboxyl, an acid anhydride, a hydroxyl and an epoxide (c) is present in the homogeneous mixture constituting the polymeric adhesive of the present invention, for a total weight of 100%, in an amount of at most 45%.

The present invention also relates to a process for the preparation of the polymeric adhesive.

The process for the preparation of the polymeric adhesive can be carried out by homogeneous mixing of at least three constituents: (a) at least one thermoplastic halogenated hydrocarbon polymer, (b) at least one copolymer of monoethylenic monomers which carry an alkyl carboxylate functional group and (c) at least one alpha-olefin polymer modified by the incorporation of at least one functional group chosen from a carboxyl, an acid anhydride, a hydroxyl and an epoxide.

The homogeneous mixing of the constituents (a), (b) and (c) of the polymeric adhesive can be carried out according to any known mixing technique, the ingredients being in the solid state or in the molten state. In order to ensure the homogeneity of the mixing and good dispersion of the constituents in the polymeric adhesive, kneading is generally carried out in the temperature region corresponding to the viscoelastic state of the polymers.

The kneading can be carried out by any means known for this purpose. Thus, it is possible to operate without distinction in kneaders of the external type or of internal type. Kneaders of the internal type are preferred and more particularly extruders, which constitute a specific class of internal kneaders. Kneading can be carried out under the usual conditions well known to a person skilled in the art.

It is possible, without distinction, to mix the three constituents together or first to mix two of them, followed by mixing with the third.

The kneading temperature is not critical and is conditioned by the nature and the decomposition temperatures of the ingredients. The operation is generally carried out at temperatures not exceeding 250° C. (220° C. for polyamides).

The duration of the kneading is chosen by taking into account the nature of the constituent polymers of the mixture and the temperature applied. The duration of the kneading can be at least 5 seconds, at least 10 seconds, at least 15 seconds, at least 10 minutes, at least 15 minutes or at least 20 minutes.

The duration of the kneading can alternatively be at most 20 minutes, at most 15 minutes, at most 10 minutes, at most 15 seconds, at most 10 seconds or at most 5 seconds.

The duration of the kneading is preferably at least 10 seconds. In a most preferred way, the duration of the kneading is at least 15 seconds.

The duration of the kneading is preferably at most 15 minutes. In a most preferred way, the duration of the kneading is at most 10 minutes.

The present invention also relates to the use of the polymeric adhesive according to the invention in the preparation of structures with multiple polymeric layers.

When it is used in structures with multiple polymeric layers according to the invention, this polymeric adhesive constitutes the layer denoted "layer (B)".

Additional constituents in minor amounts can be incorporated in the mixture constituting the layer (B) based on a polymeric adhesive. Mention may be made, by way of examples, of fluorinated elastomers (such as the fluorinated rubber DAI-EL® G 801), acrylic elastomers (such as methyl methacrylate/butadiene copolymers) and ethylene/propylene, ethylene/1-butene, propylene/1-butene and butadiene/styrene copolymers. The total amount of the additional constituent or constituents advantageously does not exceed 5% by weight with respect to the total weight of the layer (B).

The invention also relates to structures with multiple polymeric layers comprising a layer (A) based on thermoplastic halogenated hydrocarbon polymer bonded to a layer (C) based on thermoplastic nonhalogenated polymer incompatible with (A) via a layer (B) based on a polymeric adhesive as defined above.

The term "structures with multiple polymeric layers comprising a layer (A) based on thermoplastic halogenated hydrocarbon polymer bonded to a layer (C) based on thermoplastic nonhalogenated polymer incompatible with (A)" is understood to denote multilayer structures comprising at least one layer (A) based on thermoplastic halogenated hydrocarbon polymer bonded to at least one layer (C) based on thermoplastic nonhalogenated polymer incompatible with (A). The structures with multiple polymeric layers according to the invention can therefore comprise one or more layers (A) based on thermoplastic halogenated hydrocarbon polymer bonded to one or more layers (C) based on thermoplastic nonhalogenated polymer incompatible with (A), it being possible for these layers themselves to be bonded to layers of other polymers, of metal and/or of fabric.

The structures with multiple polymeric layers according to the invention preferably comprise a layer (A) based on thermoplastic fluorinated hydrocarbon polymer. In a most preferred way, they comprise a layer (A) based on vinylidene fluoride polymer.

The thermoplastic halogenated hydrocarbon polymer constituting the layer (A) can be identical to or different from the thermoplastic halogenated hydrocarbon polymer (a) which is one of the constituents of the layer (B). Use is advantageously made, as constituent of the layer (A), of a thermoplastic halogenated hydrocarbon polymer of the same nature as the thermoplastic halogenated hydrocarbon polymer (A) which is one of the constituents of the layer (B).

Other polymers compatible with the thermoplastic halogenated hydrocarbon polymer constituting the layer (A) can also be mixed with the latter. An example of such a mixture is a vinylidene fluoride polymer and poly(methyl methacrylate) composition.

The structures with multiple polymeric layers according to the invention comprise a layer (C) based on thermoplastic nonhalogenated hydrocarbon polymer incompatible with (A).

Mention may be made, among thermoplastic nonhalogenated hydrocarbon polymers incompatible with (A), by way of example, of styrene polymers, polycarbonates, polyurethanes, grafted styrene/acrylonitrile/acrylic elastomer copolymers, acrylonitrile/butadiene/styrene copolymers, polyolefins and polyamides, as well as mixtures of these polymers. Polyolefins and polyamides are preferred.

The structures with multiple polymeric layers according to the invention preferably comprise a layer (C) based on thermoplastic nonfluorinated hydrocarbon polymer incompatible with (A).

Mention may be made, among thermoplastic nonfluorinated polymers incompatible with (A).

Mention may be made, among thermoplastic nonfluorinated polymers incompatible with (A), by way of examples, of chlorinated vinyl polymers, styrene polymers, polycarbonates, polyurethanes, grafted styrene/acrylonitrile/acrylic elastomer copolymers, acrylonitrile/butadiene/styrene copolymers, polyolefins and polyamides, and mixtures of these polymers. Polyolefins and polyamides are preferred.

Among polyolefins, the preferred thermoplastic nonhalogenated polymer is polyethylene. In a most preferred way, the thermoplastic nonhalogenated polymer is high density polyethylene.

Among polyamides, the preferred thermoplastic nonhalogenated polymer is polyamide-12.

The term "polyolefins" is understood to denote homopolymers and copolymers of alpha-olefins, such as ethylene, propylene, butene, hexene, octene and decene. Preferred examples of homopolymers and copolymers of alpha-olefins comprise polyethylene, polypropylene, an ethylene/propylene copolymer, an ethylene/1-butene copolymer, an ethylene/4-methyl-1-pentene copolymer, a propylene/1-butene copolymer, poly(1-butene) and copolymers of the abovementioned alpha-olefins with minor amounts of diolefins or of unsaturated carboxylic acid esters, such as an ethylene/butadiene copolymer, a propylene-butadiene copolymer, an ethylene/vinyl acetate copolymer and an ethylene/ethyl acrylate copolymer. Mention may also be made of thermoplastic rubbers and elastomers based on alpha-olefins (such as, for example, the thermoplastic rubbers of Santoprene® trade mark). The preferred polyolefin is polyethylene. Mention may be made, as polyethylene, of low density polyethylene, linear low density polyethylene, medium density polyethylene, high density polyethylene or ultra high density polyethylene. Among these polyethylenes, high density polyethylene is particularly preferred.

The term "polyamides" is understood to denote polymers having polyamide sequences which can be obtained, for example, from caprolactam, from hexamethylenediamine and from adipic acid, from hexamethylenediamine and from sebacic acid, from undecanoic acid and from dodecalactam. Mention may be made, for example, of polyamide-6, polyamide-6,6, polyamide-6,10, polyamide-11 and polyamide-12. Polyamide-12 is preferred among these polyamides.

The structures with multiple polymeric layers according to the invention comprise a layer (B) based on a polymeric adhesive as defined above.

It is understood that each of the constituent polymers of the structures with multiple polymeric layers according to the invention can comprise the conventional additives used during the manufacture or during the processing of this polymer, such as, for example, lubricants, plasticizers, heat stabilizers, light stabilizers, particulate or fibrous fillers, pigments, flame retardants, and the like, provided that these additives do not interfere with the subject-matters of the present invention.

The invention also relates to the process for the preparation of the structures with multiple polymeric layers.

Any conventional technique for assembling polymeric layers can be resorted to in preparing the structures with multiple polymeric layers according to the invention. Mention may be made, by way of example of such techniques, of thermal bonding with the involvement of a solution of the layer (B) based on a polymeric adhesive in a solvent or a mixture of solvents. Other conventional and appropriate techniques for assembling polymeric layers in order to produce the structures with multiple polymeric layers according to the invention are those in which the constituent polymers are processed at a temperature at least equal to their softening temperature. Mention may be made, by way of examples, of hot lamination (hot pressing of preformed polymeric layers, for example, by extrusion), coextrusion, coextrusion-laminating, coextrusion-blow moulding and coextrusion-moulding.

The choice of one or other of these assembling techniques is made according to the use for which the structures with multiple polymeric layers are intended. For example, tubes, pipes, films, sheets and panels are preferably assembled by coextrusion.

Thus, the process for the preparation of structures with multiple polymeric layers is preferably carried out by coextrusion of a layer (A) based on thermoplastic halogenated hydrocarbon polymer and of a layer (C) based on thermoplastic nonhalogenated polymer incompatible with (A), with which layers is coextruded, as an intermediate acting as binder, a layer (B) based on a polymeric adhesive according to the invention.

The thickness of the constituent polymeric layers of the structures with multiple polymeric layers according to the invention and the overall thickness of the said structures are not critical and depend, of course, on the use for which they are intended. The overall thickness of the said structures preferably does not exceed 2 mm.

The thickness of the layer (A) can be at least 100 $\mu$m, at least 200 $\mu$m or at least 600 $\mu$m. The thickness of the layer (B) can be at least 30 $\mu$m, at least 100 $\mu$m or at least 400 $\mu$m. The thickness of the layer (C) can be at least 100 $\mu$m, at least 500 $\mu$m or at least 800 $\mu$m.

The thickness of the layer (A) can alternatively be at most 600 $\mu$m, at most 200 $\mu$m or at most 100 $\mu$m. The thickness of the layer (B) can be at most 400 mm, at most 100 $\mu$m or at least 30 $\mu$m. The thickness of the layer (C) can be at most 800 $\mu$m, at most 500 $\mu$m or at most 100 $\mu$m.

Preferably, the thickness of the layer (A) is approximately 200 $\mu$m. Preferably, the thickness of the layer (B) is approximately 100 $\mu$m. Preferably, the thickness of the layer (C) is approximately 500 $\mu$m.

The invention also relates to the use of the structures with multiple polymeric layers according to the invention in the manufacture of pipes, tubes, films, sheets, panels and hollow bodies.

The structures with multiple polymeric layers according to the invention can advantageously be used in fields of application requiring good impermeability to liquids and to gases, in combination with high chemical inertia. It is possible to indicate, by way of non-limiting practical examples of uses of structures with multiple polymeric layers according to the invention, tubes intended for the transportation of fuel, of corrosive products or of ultra pure water; pipes which carry gas; films intended for protecting body parts of automobile vehicles from corrosion; composite films, sheets and panels for applications in the field of construction and of agriculture; packing bottles; liquid storage tanks and petrol tanks.

The invention additionally relates to a method which makes it possible to make a layer (A) based on thermoplastic halogenated hydrocarbon polymer adhere to a layer (C) based on thermoplastic nonhalogenated polymer incompatible with (A).

The structures with multiple polymeric layers of the present invention have a good peel strength and combine the advantages of a thermoplastic halogenated hydrocarbon polymer with the properties inherent to the thermoplastic nonhalogenated polymer to which it is bonded.

The examples which follow are intended to illustrate the present invention without, however, limiting the scope thereof.

In all the examples, the peel strength was measured on an Instron Corporation device, after leaving the extruded structures to stand for 7 days, by the following method: the level of adhesion between the PVDF layer and the HDPE or PA layer is measured by carrying out the peel test on 8×6 mm pipes at a rate of 25 mm/min, the result being expressed in N/cm.

The chemical resistance of the structures with multiple polymeric layers was measured after immersion in CTF 2 fuel (mixture of 46.25% of isooctane, of 46.25% of toluene, of 2.5% of ethanol and 5% of methanol) at 60° C. for 7, 15 and 30 days. The change in the dimensional characteristics was monitored (for Examples 2, 3 and 4), as well as the resistance to peeling of the structures, both impregnated with fuel and after desorption for 42 hours (for Examples 2 and 3).

The mechanical strength of the structures with multiple polymeric layers was evaluated by the Hoop Stress test, which is a test of resistance to straightforward forward rupture at 60° C. under an $N_2$ pressure (for Examples 2, 3 and 4).

EXAMPLE 1

A homogeneous adhesive mixture was formed by dry kneading 66.7% by weight of a vinylidene fluoride homopolymer (PVDF) (Solef® 1010 from Solvay), 11.1% by weight of methyl methacrylate and glycidyl methacrylate copolymer (50%/50% by weight) (MMA-GMA copolymer) (Blemmer® CP 50 M from Nippon Oil & Fats) and 22.2% of a linear low density ethylene homopolymer (L-LDPE) grafted with maleic anhydride (Admer® NF 530 E from Mitsui & Co).

A three-layer structure (pipe) was obtained by coextrusion of this homogeneous adhesive mixture with an internal PVDF layer and an external layer of a high density ethylene homopolymer (HDPE) (Eltex® TUB 131 from Solvay) using 3 single-screw extruders (Collin) arranged around a die, so as to obtain 8×6 mm pipes (that is to say, with an external diameter of 8 mm and an internal diameter of 6 mm.

The thickness of the layers was approximately 200 $\mu$m for the PVDF, approximately 100 $\mu$m for the adhesive mixture and approximately 500 $\mu$m for the HDPE.

The resistance to peeling which was measured is 12 N/cm.

EXAMPLE 2

A homogeneous adhesive mixture was formed as in Example 1 with 66.7% by weight of PVDF, 8.3% by weight of MMA-GMA copolymer and 25.0% by weight of PE grafted with maleic anhydride.

A three-layer structure (pipe) was obtained by coextrusion of this homogeneous adhesive mixture with an internal PVDF layer and an external HDPE layer, as in Example 1.

The resistance to peeling which was measured is 11 N/cm. After immersion in the CTF 2 fuel at 60° C. for 30 days, the resistance to peeling fell to 4 N/cm but rose again to 5 N/cm after drying for 42 hours.

The study of the chemical resistance of the pipes in the CTF 2 fuel showed a rapid equilibration for an uptake in weight of the order of 10% and a mean elongation of 1.5%.

The Hoop Stress which was measured is 15.8 MPa.

EXAMPLE 3

A three-layer structure (pipe) was obtained by coextrusion of the same homogeneous adhesive mixture as in Example 1 with an internal layer of a PVDF homopolymer (Solef® 1010 from Solvay) and an external layer of polyamide-12 (PA 12) (Grilamid® L 25 W 40 from EMS Chemie) using the same extruders as in Example 1.

The resistance to peeling which was measured is 13 N/cm. After immersion in the CTF 2 fuel at 60° C. for 30 days, the resistance to peeling fell to 3 N/cm but rose again to 4 N/cm after drying for 42 hours.

The study of the chemical resistance of the pipes in the CTF 2 fuel showed a rapid equilibration for an uptake in weight of the order of 7.6% and a mean elongation of 1%.

The Hoop Stress which was measured is 14.0 MPa.

EXAMPLE 4

A homogeneous adhesive mixture was formed as in Example 1 with 71.4% by weight of PVDF, 7.1% by weight of MMA-GMA copolymer and 21.5% by weight of PE grafted with maleic anhydride.

A three-layer structure (pipe) was obtained by coextrusion of this homogeneous adhesive mixture with an internal PVDF layer and an external layer of polyamide-6,36

(Sniamid® PSB 162 A from Nyltech) using the same extruders as in Example 1.

The resistance to peeling which was measured is 11 N/cm.

The study of the chemical resistance of the pipes in the CTF 2 fuel showed a rapid equilibration for an uptake in weight of the order of 6.3% and a mean elongation of 1.5%.

The Hoop Stress which was measured is 14.5 MPa.

What is claimed is:

1. A structure having multiple polymeric layers comprising a first layer based on a thermoplastic halogenated hydrocarbon polymer bonded to a second layer, said second layer being based on a thermoplastic nonhalogenated polymer incompatible with said thermoplastic halogenated hydrocarbon polymer, via a third layer based on a polymeric adhesive which is a homogeneous mixture of at least three constituents: (a) at least one thermoplastic halogenated hydrocarbon polymer, (b) at least one copolymer comprising at least two monoethylenic monomers, each monomer carrying an alkyl carboxylate functional group and (c) at least one alpha-olefin polymer modified by the incorporation of at least one functional group selected from the group consisting of a carboxyl, an acid anhydride, a hydroxyl and an epoxide.

2. The structure according to claim 1, wherein said first layer is based on a thermoplastic fluorinated hydrocarbon polymer.

3. The structure according to claim 1, wherein said first layer is based on a vinylidene fluoride polymer.

4. The structure according to claim 1, wherein said second layer is based on a thermoplastic nonhalogenated polymer incompatible with said thermoplastic halogenated hydrocarbon polymer which is chosen from polyolefins and polyamides.

5. The structure according to claim 1, wherein said second layer is based on a thermoplastic nonhalogenated polymer incompatible with said thermoplastic halogenated hydrocarbon polymer which is chosen from polyethylene and polyamide-12.

6. A method of manufacturing structures with multiple polymeric layers comprising bonding said layers together using a polymeric adhesive comprising a homogeneous mixture of at least three constituents: (a) at least one thermoplastic halogenated hydrocarbon polymer, (b) at least one copolymer comprising at least two monoethylenic monomers, each monomer carrying an alkyl carboxylate functional group and (c) at least one alpha-olefin polymer modified by the incorporation of at least one functional group selected from the group consisting of a carboxyl, an acid anhydride, a hydroxyl and an epoxide.

7. A method of manufacturing structures with multiple polymeric layers comprising bonding said layers together using a polymeric adhesive consisting essential of a homogeneous mixture of at least three constituents:

a) at least one thermoplastic halogenated hydrocarbon polymer, b) at least two different monoethylenic monomers forming at least one copolymer, each of the at least two different monoethylenic monomers having an alkyl carboxylate functional group, and c) at least one alpha-olefin polymer modified by the incorporation of at least one functional group selected from the group consisting of a carboxyl, an acid anhydride, a hydroxyl and an epoxide.

8. A method of manufacturing pipes, tubes, films, sheets, panels and hollow bodies comprising assembling a structure having multiple polymeric layers comprising a first layer based on a thermoplastic halogenated hydrocarbon polymer bonded to a second layer based on a thermoplastic nonhalogenated polymer, said second layer being incompatible with said thermoplastic halogenated hydrocarbon polymer, via a third layer based on a polymeric adhesive which is a homogeneous mixture of at least three constituents: (a) at least one thermoplastic halogenated hydrocarbon polymer, (b) at least one copolymer comprising at least two monoethylenic monomers, each monomer carrying an alkyl carboxylate functional group and (c) at least one alpha-olefin polymer modified by the incorporation of at least one functional group selected from the group consisting of a carboxyl, an acid anhydride, a hydroxyl and an epoxide.

9. A process for the preparation of structures with multiple polymeric layers comprising: coextruding a first layer based on thermoplastic halogenated hydrocarbon polymer and a second layer based on thermoplastic nonhalogenated polymer incompatible with said thermoplastic halogenated hydrocarbon polymer, and coextruding a third layer based on a polymeric adhesive as an intermediate acting as a binder, the adhesive comprising a homogeneous mixture of at least three constituents: (a) at least one thermoplastic halogenated hydrocarbon polymer, (b) at least one copolymer comprising at least two monoethylenic monomers, each monomer carrying an alkyl carboxylate functional group and (c) at least one alpha-olefin polymer modified by the incorporation of at least one functional group selected from the group consisting of a carboxyl, an acid anhydride, a hydroxyl and an epoxide.

* * * * *